United States Patent [19]
Chiang

[11] Patent Number: 5,435,362
[45] Date of Patent: Jul. 25, 1995

[54] CAR CAB COVER

[76] Inventor: Hsi-Ming Chiang, 930 St. Andrews Dr., Malvern, Pa. 19355

[21] Appl. No.: 136,886

[22] Filed: Oct. 18, 1993

[51] Int. Cl.⁶ .............................................. B60J 11/00
[52] U.S. Cl. .................................. 150/166; 296/95.1; 296/136
[58] Field of Search ............... 150/166, 168; 296/136, 296/95.1

[56] References Cited

U.S. PATENT DOCUMENTS

| | | | |
|---|---|---|---|
| 2,666,840 | 1/1954 | Poirier | 150/166 X |
| 2,801,667 | 8/1957 | Curran | 150/166 |
| 3,665,355 | 5/1972 | Sasaki et al. | 296/136 X |
| 4,209,197 | 6/1980 | Fischer | 150/166 X |
| 4,355,839 | 10/1982 | Rosen | 150/166 |
| 4,821,785 | 4/1989 | Rolan | 150/166 |
| 4,825,889 | 5/1989 | Montieth | 296/136 X |
| 4,827,997 | 5/1989 | Rolan | 150/166 |
| 4,842,324 | 6/1989 | Carden | 150/166 X |
| 4,867,216 | 9/1989 | McKee | 150/166 |
| 4,952,007 | 8/1990 | Shahrokh | 296/136 |
| 4,972,892 | 11/1990 | Yeh | 150/166 |
| 5,029,933 | 7/1991 | Gillem | 150/166 |
| 5,112,098 | 5/1992 | Lichtmann | 296/136 |
| 5,129,677 | 7/1992 | Marshall | 150/166 X |
| 5,147,713 | 9/1992 | Dalbec et al. | 150/166 X |
| 5,161,849 | 11/1992 | Holland, Jr. | 150/166 X |
| 5,167,267 | 12/1992 | McQuaid | 150/166 |
| 5,188,417 | 2/1993 | Curchod | 150/166 X |
| 5,242,205 | 9/1993 | Garner | 150/166 X |
| 5,244,296 | 9/1993 | Cunningham | 296/136 |
| 5,292,167 | 3/1994 | Hellman | 150/168 X |

FOREIGN PATENT DOCUMENTS

| | | | |
|---|---|---|---|
| 488356 | 11/1975 | Australia | 296/136 |
| 1238286 | 7/1960 | France | 296/136 |
| 2524398 | 10/1983 | France | 296/136 |
| 3814044 | 10/1988 | Germany . | |
| 577167 | 5/1958 | Italy | 296/136 |
| 785039 | 10/1957 | United Kingdom | 296/136 |
| 851966 | 10/1960 | United Kingdom . | |
| 2167719 | 6/1986 | United Kingdom . | |

*Primary Examiner*—Sue A. Weaver
*Attorney, Agent, or Firm*—Richard C. Litman

[57] ABSTRACT

A car cover having tethers passing through holes formed in the cover. Each tether has an anchor in the form of a ball attached thereto. The anchor is larger than the interior diameter of the holes, so that the tether is prevented from being pulled through the hole. The cover is retained on the vehicle by placing at least one anchor inside the vehicle, and closing a door or window over the tether. In alternative embodiments, the vehicle cover has one or more tethers. The tethers may be linear, or may form a closed loop. A tether may pass through just one hole, or more than one hole. The cover is preferably dimensioned and configured to cover only the cab portion of a motor vehicle, that is, that portion of the vehicle having any combination of front, rear, and side windows. The holes are formed in a central panel overlying the vehicle roof, and front, rear, and side panels cover vertical surfaces, attaching to the vehicle body by magnets embedded in the respective panels. The material is preferably a multistratum composite having one reflective side and one water impermeable side. It is therefore highly practical to provide a reversible cover which selectively protects against sun and frozen water, which is compact, light, and easily installed and removed, and which requires no separate or complicated security apparatus.

16 Claims, 3 Drawing Sheets

CAR CAB COVER

BACKGROUND OF THE INVENTION

1. FIELD OF THE INVENTION

The present invention relates to flexible car covers, and more particularly to a cover for the cab portion of a vehicle, the cover having theft resistant anchoring members secured by closing a vehicle door or window thereover.

2. DESCRIPTION OF THE PRIOR ART

Motor vehicles, and particularly privately owned automobiles, are susceptible to being rendered uncomfortable and to being damaged by periodic exposure to the sun and weather. One especially vexing problem for the typical owner of a car is that when parked temporarily in the sun, the passenger compartment quickly becomes quite hot. This is very uncomfortable to passengers upon returning to the vehicle. It is also potentially damaging to the car and its contents. Plastic and leather fabrics and coverings are more rapidly aged or dried by exposure to heat or to ultraviolet light which enters the cab. Certain personal property commonly carried in cars, such as magnetic audio tapes, are also quite susceptible to damage from heat.

Other environmental hazards which are desirable to avoid include dust, dirt, rain, snow, frost, and ice formation on vehicle windows.

Motor vehicle covers have been developed to protect vehicles from these conditions. Some are full body covers, that is, which envelope or cover an entire vehicle body. Others are designed specifically to cover only the window area, since both heat and window fouling hazards impinge principally on the cab area of motor vehicles. A cover which covers the windows only, or which covers roof and windows, will be termed a cab cover. A full body cover can be awkward and unwieldy to install, unattractive, and may occupy a large amount of space when stored.

Both types of covers, full body and cab, if sufficiently small, light, and flexible as to conform to vehicle body contours and to be easily installed and removed, are susceptible to theft.

Car covers, therefore, must be designed to accommodate conflicting requirements. Many different approaches have been attempted to produce a satisfactory cover.

Covers which are contoured and configured specifically to protect only the cab portion of a car are seen in U.S. Pat. Nos. 4,842,324, issued to Harvey K. Carden on Jun. 27, 1989; 4,972,892, issued to George C. Yeh on Nov. 27, 1990; and 5,029,933, issued to Vernon A. Gillem on Jul. 9, 1991. The cover of Carden '324 comprises a rectangular panel having slit corners, so that the resultant cover conforms closely to the cab when draped thereover. Theft deterrence is addressed by locating one end of the cover in the vehicle trunk, a portion feeding through the gap between trunk lid and body. When closed, the trunk lid effectively secures the cover against theft. Securement against theft by entrapment by a trunk lid is also seen in Gillem '933.

Yeh '892 also slits the corners of a triangular fabric to produce a conforming cover. The cover is further secured to the vehicle by magnetic adhesion of magnets embedded in the cover fabric, and by straps having hook and loop fasteners. The cover of this invention is made from plural plies, there being sun resistant material facing in one direction, and water repellant material exposed on the other side. The cover is reversible, thus providing both heat protection in the summer, and freeze protection in the winter.

A full body cover is disclosed in U.S. Pat. No. 5,188,417, issued to Donald B. Curchod on Feb. 23, 1993. The cover disclosed therein is stowed in the trunk and feeds therefrom for deployment. Further securement against theft is provided by closing vehicle doors over a portion of the cover.

It would be possible to secure a vehicle cover by passing a strap or cable through the gap between a vehicle door and body, there being an enlarged member preventing the strap or cable from being pulled free. This is shown in U.S. Pat. No. 5,242,205, issued to John M. Garner.

In a further effort to deter theft, Garner provides an audible alarm incorporated into the enlarged member.

Multilayered fabrics for car covers are exemplified by U.S. Pat. No. 4,821,785, issued to Rolan on Apr. 18, 1989. Rolan's fabric includes an inner layer of a smooth, self-lubricating material for protecting the exterior paint or finish, as polyethylene or polypropylene. A reinforcing layer is provided next, when the first layer lacks sufficient strength. A vapor-tight and light resistant barrier is then provided by an outer plastic film, such as polyester, and a thin metal layer.

None of the above inventions and patents, taken either singly or in combination, is seen to describe the instant invention as claimed.

SUMMARY OF THE INVENTION

A preferred vehicle cover for protecting ordinary passenger sedans and like vehicles is provided by a reversible cover for the cab only. Since it is desired primarily to protect windows from fouling and the interior from heating, a cover is required essentially only for the windows. A more extensive cover, while addressing a slightly different need, is more difficult to install and to fold and stow. It is also less attractive, since a larger cover, unless very carefully configured to cooperate with a particular vehicle body, is invariably bulky and ill-fitting.

One practical aspect of a cab-only cover is that it can be secured to the vehicle at the top of the door, or by rolling up a window. This is not possible with a full body cover.

It is also desirable to provide a vehicle cover which is reversible, selectively exposing a reflective surface upwardly for heating protection from the sun, and exposing a water impermeable surface to ward off rain, snow, and ice.

The present invention provides a vehicle cover which satisfies these objectives, while improving on the practicality of the prior art. The novel vehicle cover includes a central panel overlying the roof portion of the vehicle, and front, rear, and side panels which cover the windows. The front, rear, and side panels will also be referred to as "lateral panels" hereinafter.

Securement of the novel cover is by entrapment of anchors within the vehicle. Tethers passing through holes formed in the central panel are placed between the door and its jamb, or between the window and its casing of the vehicle, and the respective door or window is closed thereover. The anchor comprises an enlarged object too bulky to be pulled through the gap between door and jam, or window and casing, and therefore secures the cover to the vehicle.

This arrangement is very advantageous for several reasons. Firstly, the tether is integral with the cover, in the sense that there are no separate parts which could become lost. Also, there is no requirement for additional locking apparatus.

Despite the tether being integral with the cover, it is adjustable as to length. This enables ready manipulation when installing the cover on a vehicle, and adapts the cover to vehicles having differing dimensions and configurations.

The anchors enable the doors or windows of a vehicle to retain a cover member in positive fashion. The trunk of the vehicle need not be involved in entrapping the cover. It may be inconvenient to open and close the trunk of a sedan in order to secure a cover. And if the main securement is provided at the rear of the cover, additional attachment may be required to hold the cover squarely on the vehicle body.

Accordingly, it is a principal object of the invention to provide a vehicle cover for a vehicle which is secured to the vehicle by entrapment of cover members by the doors or windows of the vehicle, and particularly at the top of the doors or windows.

It is another object of the invention to provide entrapped cover members which extend a slidably adjustable distance from the cover.

It is a further object of the invention to provide a reversible cover for a vehicle which selectively protects against sun and heat, and against water and freezing water.

A still further object of the invention is to provide a vehicle cover wherein slidably adjustable entrapped members are not removable from the cover.

An additional object of the invention is to provide a vehicle cover which is adjustable to fit differently configured vehicles.

Still another object of the invention is to provide a vehicle cover having lateral panels which self-adhere to a vehicle body.

Still an additional object of the invention is to provide a vehicle cover which is readily manipulated and installed on the vehicle.

It is a further object of the invention to provide a vehicle cover which is compact, easily stowed, and protects the cab of the vehicle.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
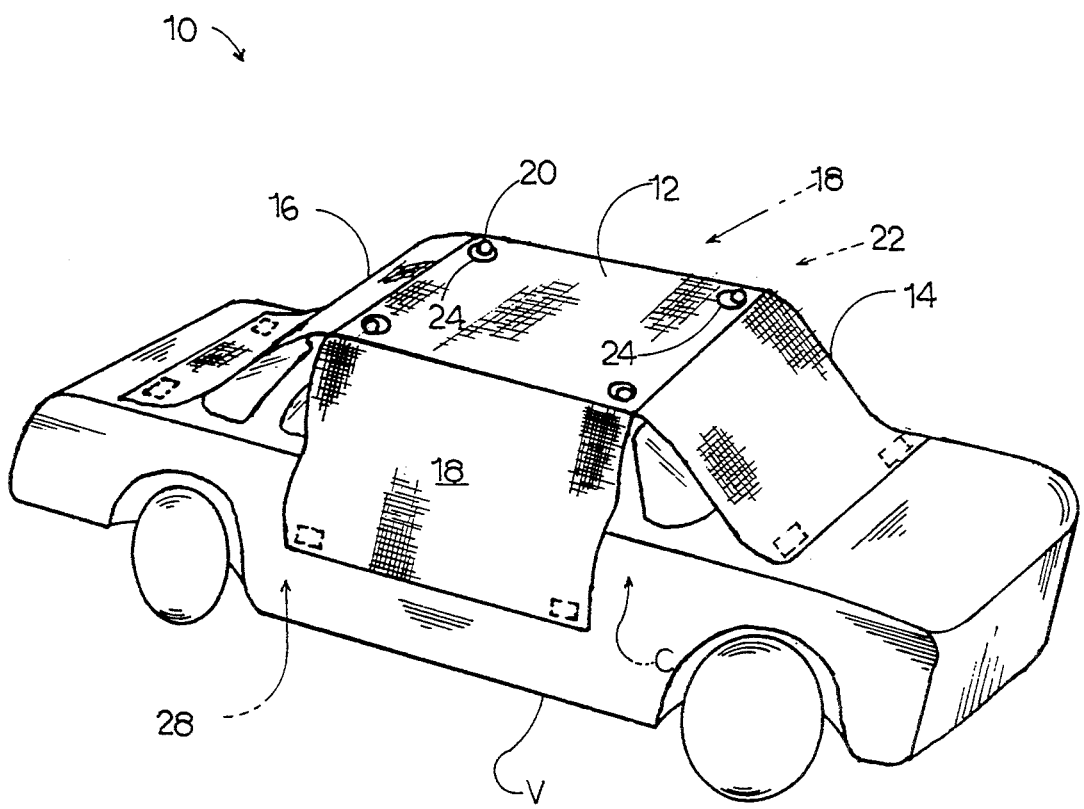
FIG. 1 is a diagrammatic, perspective view of the invention.

The vehicle cover 10 of the present invention is seen installed on a vehicle V in FIG. 1. Vehicle cover 10 is preferably a cab cover, including a central panel 12 covering and overlying a generally horizontal roof portion of the cab or passenger compartment C of the vehicle, a front panel 14, a rear panel 16, and side panels 18. Panels 14, 16, 18 cover the windows of the vehicle, and project vertically downwardly from the periphery of central panel 12.

Central panel 12 is held in place by four anchors 20. Anchors 20 attach to tethers (not shown) passing through holes 22 formed in central panel 12, holes 22 being reinforced by eyelets 24 or by other suitable means.

Figure 2:
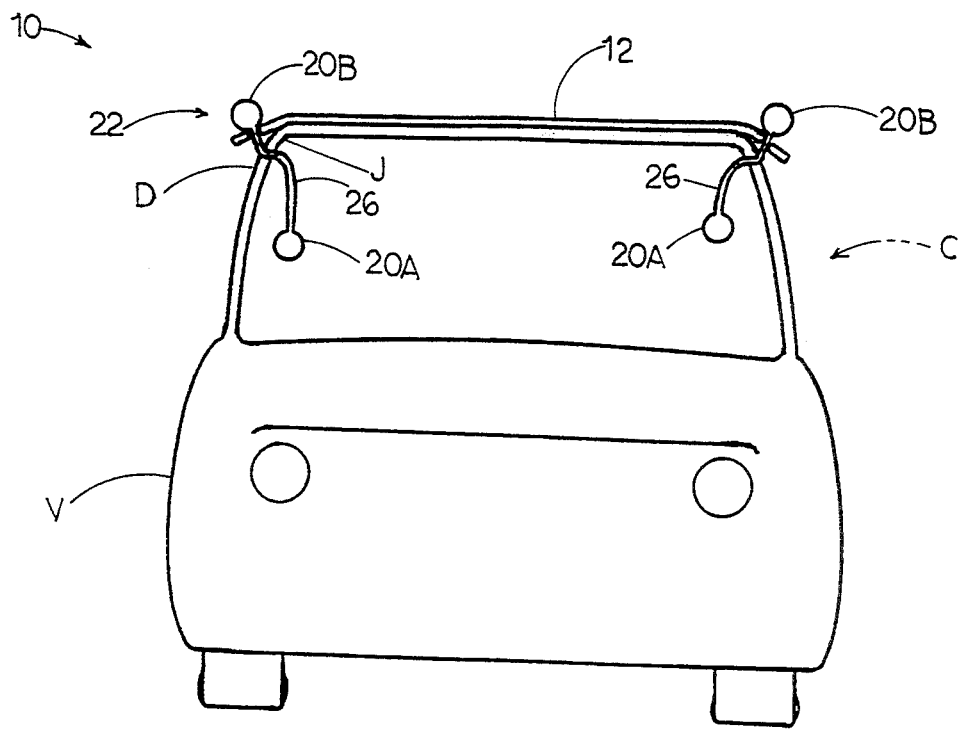
FIG. 2 is a diagrammatic, front cross-sectional, environmental view of the invention, drawn to enlarged scale.

Anchors 20 are crucial to a securement arrangement which is best understood by reference to FIG. 2. Each one of several tethers 26 has two anchors 20 securely attached thereto. Anchors 20 comprise enlarged members formed at the ends of tether 26. Anchors 20 have a minimum diameter dimension greater than the cube minimum interior diameter dimension of each hole 22, and an anchor 20 will interfere with an adjacent hole 22. Therefore, an anchor 20 cannot pass through a hole 22, and tether 26 is permanently attached to vehicle cover 10, being slidably retained in a hole 22.

One end of tether 26 is passed into the passenger compartment C of vehicle V, being placed between door D and door jamb J. The door is then closed, entrapping anchor 20A. Anchor 20B prevents vehicle cover 10 from being pulled free of tether 26. Vehicle cover 10 is thereby secured by vehicle parts, and employing the conventional, pre-existing vehicle lock system (not shown).

Figure 3:
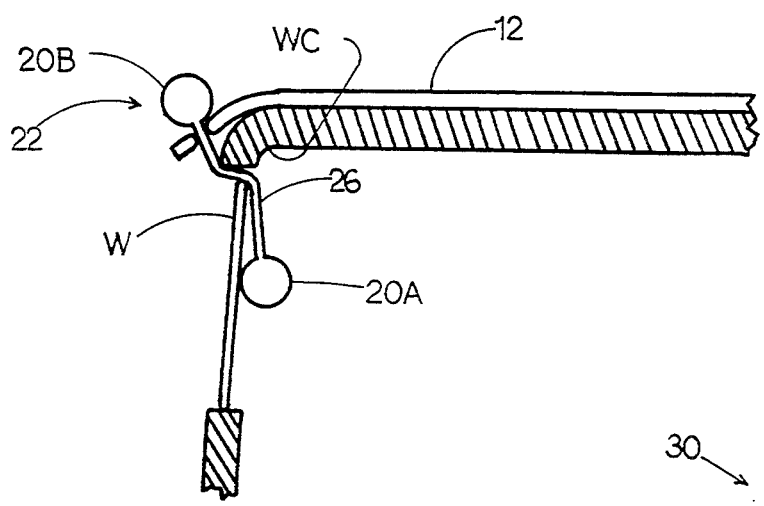
FIG. 3 is a diagrammatic, front cross-sectional, environmental view of the invention, showing a second method of use, drawn to enlarged scale.

As seen in FIG. 3, it is also feasible to lock anchor 20A by passing tether 26 through a window, between the window W and its window casing WC.

Front, rear, and side panels 14, 16, 18 hang downwardly, covering their respective windows, and adhere to the vehicle body by magnets 28 (see FIG. 1) embedded within the panel fabric. This prevents the wind from uncovering a window.

Figure 4:
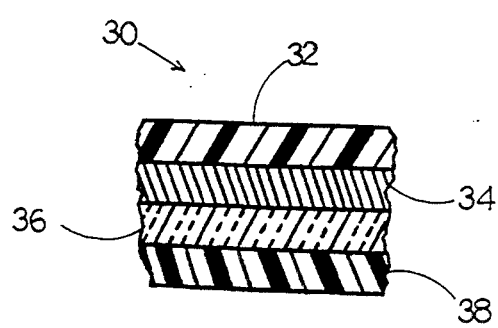
FIG. 4 is a diagrammatic, cross-sectional view of a preferred material for making the vehicle cover panels.

A preferred material 30 for fabricating panels 12, 14, 16, 18 is shown in FIG. 4. A top layer 32 is made from a material, preferably a flexible synthetic resin, having reflective characteristics, or of very light color. This layer 32 would be selected as the upwardly exposed layer when it is desired to protect the passenger compartment or cab C from sunlight and heat.

The second layer 34 is preferably metallic, such as aluminum foil. This imparts strength and improves the integrity of the first layer when exposed to light, moisture, and other contaminants.

A third layer 36 is made from a thermally insulating material.

The last layer 38 is made from a dark or heat absorbing material, preferably also a flexible synthetic resin. Although layer 36 prevents heat from readily entering the cab of the vehicle, any accumulation of snow, sleet, or ice which may form on vehicle cover 10 is more quickly melted if a heat absorbing material is exposed.

Figure 5:
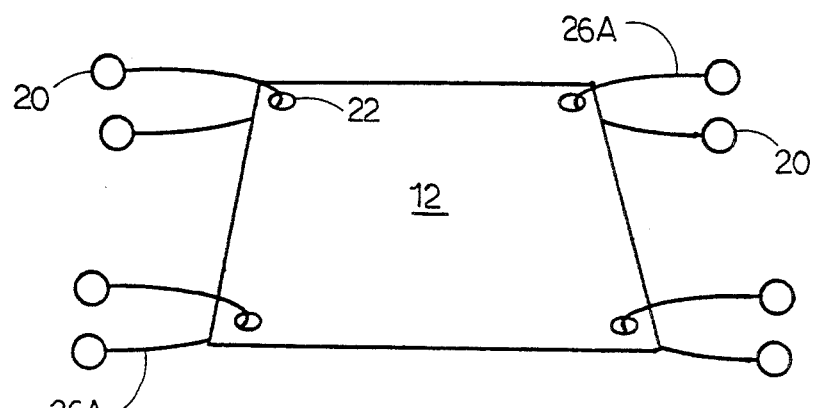
FIGS. 5, 6, and 7 are diagrammatic, perspective, detail views of three embodiments of the invention illustrating tethering arrangement, drawn to reduced scale.
Figure 6:
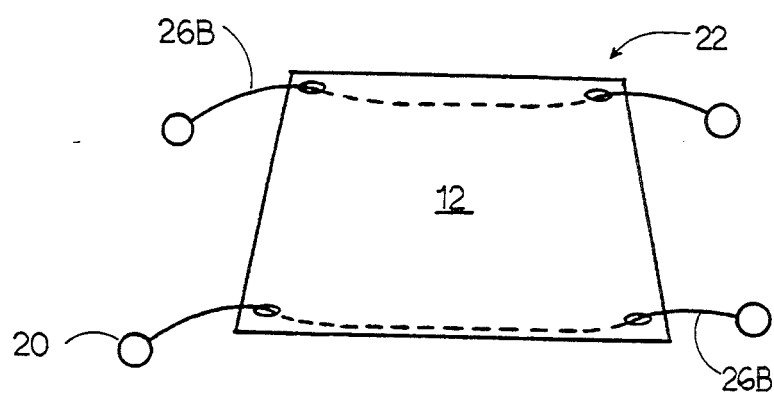
Figure 7:
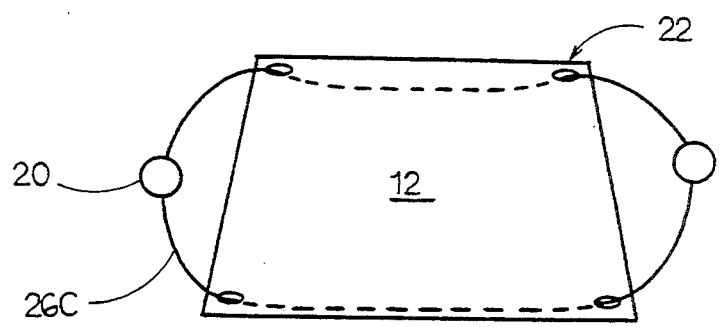

Several different arrangements of tethers are possible, as shown in FIGS. 5, 6, and 7. The arrangement shown in FIGS. 2 and 3 corresponds to a first embodiment of the invention illustrated in FIG. 5. In this embodiment, there are four tethers 26A, shown exaggerated in length, each tether 26A passing through one associated hole 22.

In a second embodiment, illustrated in FIG. 6, there are two tethers 26B. Each tether 26B is of greater length than the tether of the first embodiment, and spans central panel 12. Tethers 26B may be oriented front to rear, or right side to left side of the cab. This arrangement reduces the number of separate tethers and minimizes the number of anchors 20.

In a third embodiment, illustrated in FIG. 7, a single tether 26C forms a closed loop, and has two anchors 20.

In each of the three embodiments presented hereinabove, regardless of the precise arrangement thereof, a tether projects from the novel vehicle cover, and extends into the interior of the vehicle. The resultant cover is compact, light, and effectively secured to its associated vehicle.

It is to be understood that the present invention is not limited to the embodiments described above, but encompasses any and all embodiments within the scope of the following claims.

I claim:

1. A vehicle cover comprising:
 a central panel for covering a roof portion of a vehicle cab; front, rear and two side panels attached to said central panel for covering vertical surfaces of the vehicle cab;
 said central panel having four holes spaced apart and located at four corners of said central panel, each of the four holes having a permanently attached tether passing therethrough;
 each said permanently attached tether having two ends, each of said ends having an anchor attached thereto, whereby said vehicle cover, when placed on a vehicle, is secured thereto when said anchor is placed inside the vehicle by closing selectively one of a vehicle door and a window over said permanently attached tether.

2. The vehicle cover according to claim 1, wherein said front, rear, and side panels have magnets embedded therein, whereby said front, rear, and side panels are adhered to the vehicle body.

3. The vehicle cover according to claim 1, there being four said tethers, each said tether passing through one said hole.

4. The vehicle cover according to claim 1, there being two tethers provided for attachment at said holes, one of said two tethers passing through two of said four holes.

5. The vehicle cover according to claim 1, each of said holes having a minimum interior diameter, said anchor having a minimum diameter of dimension greater than the diameter of the interior diameter of an adjacent said hole, whereby said tether is prevented from being pulled through said hole and out of engagement with said cover.

6. The vehicle cover according to claim 1, wherein said cover is reversible and comprises a reflective top layer and a heat absorbing bottom layer.

7. A vehicle cover having:
 two permanently attached tethers each having anchors located at each end thereof;
 four holes extending through said cover; and
 one of said two tethers passing through two of said four holes, said one tether thereby remaining slidably retained within two holes, whereby said vehicle cover, when placed on a vehicle, is secured to the vehicle by closing selectively one of a vehicle door and a window over said tether when said anchors are placed inside the vehicle.

8. A vehicle cover according to claim 7, said vehicle cover includes a central panel for covering and overlying a generally horizontal roof portion of a cab of the vehicle, said four holes spaced apart and located at four corners of the vehicle roof portion.

9. A vehicle cover according to claim 7, each anchor having a minimum diameter, each one of said holes having a minimum interior diameter, and anchor said anchor minimum diameter being of dimension greater than the dimension of the interior diameter of an adjacent hole, whereby said tether is prevented against being removed from said vehicle cover by interference between a said anchor and adjacent said hole.

10. A vehicle cover according to claim 7, further comprising front, rear, and side panels attached to said cover for covering vertical surfaces of the vehicle, said front, rear, and side panels having magnets embedded therein, whereby said front, rear, and side panels are adhered to the vehicle body.

11. The vehicle cover according to claim 7, wherein said cover is reversible and comprises a reflective top layer and a heat absorbing bottom layer.

12. A vehicle cover having:
 one permanently attached tether forming a closed loop and having at least two anchors located therealong, and
 a plurality of holes extending through said cover,
 said tether passing through each one of said holes, said tether thereby remaining slidably retained within said holes, whereby said vehicle cover, when placed on a vehicle, is secured to the vehicle body by closing selectively one of a vehicle door and a window over said tether when said anchors are placed inside the vehicle.

13. The vehicle cover according to claim 12, said vehicle including a central panel for covering and overlying a generally horizontal roof portion of a cab of the vehicle, said a plurality of holes includes four holes spaced apart and located at four corners of the vehicle roof portion.

14. The vehicle cover according to claim 12, each one of said at least two anchors having a minimum diameter, each one of said holes having a minimum interior diameter, said minimum diameter being of dimension greater than the dimension of the interior diameter of an adjacent said hole, whereby said tether is prevented from being removed from said vehicle cover by interference between a said anchor and a said hole.

15. The vehicle cover according to claim 12, further comprising front, rear, and side panels attached to said cover for covering vertical surfaces of the vehicle, said front, rear, and side panels having magnets embedded therein, whereby said front, rear, and side panels are adhered to the vehicle body.

16. The vehicle cover according to claim 12 wherein said cover is reversible and comprises a reflective top layer and a heat absorbing bottom layer.

* * * * *